(12) United States Patent
Warren et al.

(10) Patent No.: US 7,074,373 B1
(45) Date of Patent: Jul. 11, 2006

(54) THERMALLY-INTEGRATED LOW TEMPERATURE WATER-GAS SHIFT REACTOR APPARATUS AND PROCESS

(75) Inventors: David W. Warren, Van Nuys, CA (US); Michael B. Donahue, La Verne, CA (US)

(73) Assignee: Harvest Energy Technology, Inc., Sun Valley, CA (US)

( * ) Notice: Subject to any disclaimer, the term of this patent is extended or adjusted under 35 U.S.C. 154(b) by 370 days.

(21) Appl. No.: 09/709,616

(22) Filed: Nov. 13, 2000

(51) Int. Cl.
*B01J 8/02* (2006.01)
*C01B 3/48* (2006.01)

(52) U.S. Cl. ...................... 422/198; 422/211; 422/220; 422/200; 423/655

(58) Field of Classification Search ................ 422/173, 422/190–191, 198, 200–201, 211; 423/655, 423/656, 246, 247; 252/373; 429/19
See application file for complete search history.

(56) References Cited

U.S. PATENT DOCUMENTS

| | | | |
|---|---|---|---|
| 389,900 A | 9/1888 | Pratt et al. | |
| 1,987,911 A * | 1/1935 | Prickett | 422/198 |
| 2,066,198 A | 12/1936 | Buc | |
| 2,078,948 A * | 5/1937 | Houdry | 422/200 |
| 2,662,911 A * | 12/1953 | Dorschner et. al. | 518/712 |
| 3,607,125 A * | 9/1971 | Kydd | 422/197 |
| 3,666,682 A * | 5/1972 | Muenger | 252/373 |
| 3,672,847 A | 6/1972 | Esselink | |
| 4,083,695 A | 4/1978 | Haese et al. | |
| 4,134,908 A * | 1/1979 | Steiner et al. | 518/715 |
| 4,692,306 A | 9/1987 | Minet et al. | |
| 4,810,472 A | 3/1989 | Andrew et al. | |
| 5,382,271 A | 1/1995 | Ng et al. | |
| 5,458,857 A * | 10/1995 | Collins et al. | 422/198 |
| 5,464,606 A * | 11/1995 | Buswell et al. | 423/655 |

FOREIGN PATENT DOCUMENTS

| | | |
|---|---|---|
| JP | 62106834 A * | 5/1987 |
| WO | WO 97/44123 | * 11/1997 |

* cited by examiner

*Primary Examiner*—Hien Tran
*Assistant Examiner*—Jennifer A. Leung
(74) *Attorney, Agent, or Firm*—William W. Haefliger

(57) ABSTRACT

A thermally-integrated lower temperature water-gas shift reactor apparatus for converting carbon monoxide in the presence steam comprises a catalyst bed that is disposed within an outer region surrounding a waste heat recovery steam generator operating at a selected pressure corresponding to the optimum temperature for conducting the catalytic water-gas shift reaction and a process for useful recovery of the exothermic heat of reaction to generate steam that is used in a process for the conversion of hydrocarbon feedstock into useful gases such as hydrogen.

12 Claims, 4 Drawing Sheets

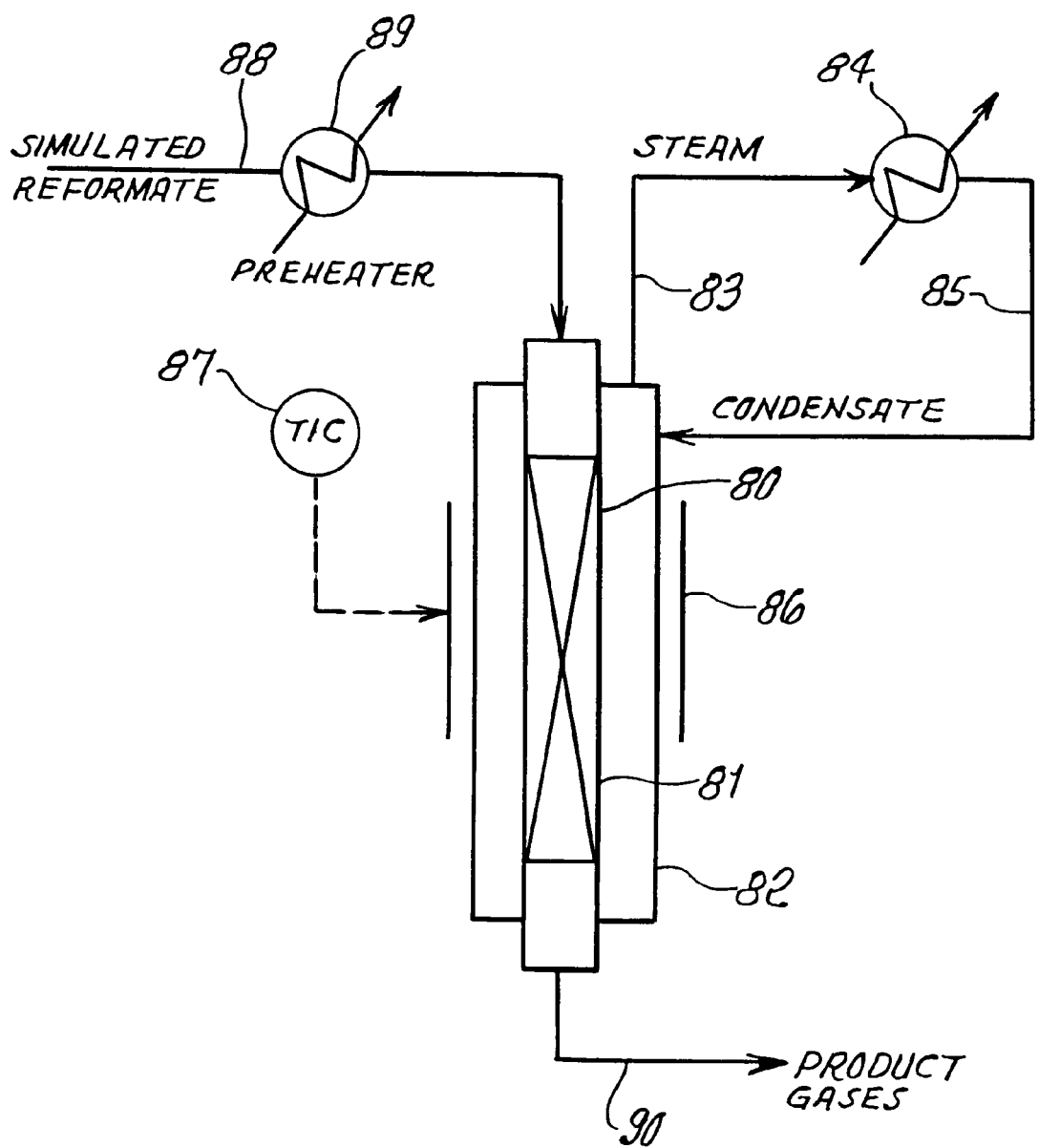

THERMALLY-INTEGRATED LOW TEMPERATURE WATER-GAS SHIFT REACTOR APPARATUS AND PROCESS

BACKGROUND OF THE INVENTION

This invention relates to a process and an apparatus for producing hydrogen for application to fuel cell electric generators.

Catalytic reaction apparatus and processes for converting hydrocarbon feedstocks to useful industrial gases, such as hydrogen, is well known in the art. Proton exchange membrane (PEM) fuel cells have emerged as a viable option for the production of disbursed electrical power, typically in the range of 2–50 k W, for use in residential and small commercial applications. PEM fuel cells generate electricity by the electrochemical reaction between hydrogen and oxygen.

While oxygen is readily available from ambient air, hydrogen must be produced from commercially available fuels, such a natural gas or propane, using methods such as steam reforming. Steam reforming is a process that involves a high temperature catalytic reaction between a hydrocarbon and steam to form a hydrogen-rich product gas, commonly referred to as reformate, that contains significant quantities of carbon monoxide.

Since PEM fuel cells have a low tolerance to carbon monoxide, the concentration of carbon monoxide in the reformate must be reduced using a catalytic reaction step known as the water-gas shift reaction. Following the water-gas shift reaction, the concentration of carbon monoxide in the reformate is further reduced to concentrations typically less than 10 ppm using a selective oxidation reaction, also referred to as preferential oxidation or PROX. The combination of processes that convert commercial fuels to a reformate suitable for use in a fuel cell is commonly referred to as a fuel processor.

As an illustration, Table 1 summarizes the reaction steps of a fuel processor designed to produce a hydrogen-rich gas stream suitable for use in a PEM fuel cell.

TABLE 1

| PEM fuel processor reaction steps | |
|---|---|
| 1. $CH_4 + H_2O = CO + H_2$ | Steam reforming |
| 2. $CO + H_2O = CO_2 + H_2$ | Water-gas shift |
| 3. $CO + \frac{1}{2}O_2 = CO_2$ | Selective oxidation |

In typical industrial practice, the water-gas shift reaction is conducted in two separate adiabatic reactors operating at two different temperature regimes. The first reactor, known as the high temperature shift reactor, operates at inlet temperatures typically ranging from about 550° F. to 650° F. The second reactor, known as the low temperature shift reactor, operates at an inlet temperature typically ranging from about 380° F. to 450° F. The combination of the two sequential water-gas shift reactions typically reduces the concentration of carbon monoxide in the reformate to less than 1.0 volume percent.

The use of a low temperature shift reactor is beneficial because the water-gas shift reaction is thermodynamically favored at lower temperatures. However, a high temperature shift reactor is generally required to limit the amount of heat that is released in the low temperature shift reactor.

Conventional low temperature shift catalysts comprise a mixture of copper and zinc that are supported on a ceramic carrier. These catalysts promote the water-gas shift reaction at lower temperature, but lose activity if they are exposed to excessively high temperatures due to sintering of the active metals. Therefore, it is generally desirable to limit the maximum temperature of the low temperature shift catalyst to about 500° F. in order to achieve long catalyst life.

The water-gas shift reaction releases approximately 9837 calories per gram-mole of carbon monoxide that is consumed. If the water-gas shift reaction were conducted using a single adiabatic low temperature shift reactor, the heat release would result in a temperature increase across the catalyst bed that would exceed the desirable temperature limit for conventional low temperature shift reactors. Furthermore, the high exit temperature from the water-gas shift reactor would be thermodynamically less favorable for achieving high conversions of carbon monoxide.

There is need to minimize the number of reactors and heat exchangers that are needed to achieve the objective of high conversion of carbon monoxide for PEM fuel cell applications, in order to reduce the size, cost and complexity of the fuel processor. Therefore, it is desirable to conduct the water-gas shift reaction using a single reactor vessel that is maintained within acceptable operating temperature limits by controlling heat removal from the reactor.

The steam reforming reaction requires large quantities of steam for the conversion of hydrocarbon to reformate. It is desirable to recover the heat released from the water-gas shift reaction for the purpose of generating steam in order to improve the thermal efficiency of the fuel processor. The present invention achieves the objective of temperature control and heat recovery by integrating a lower temperature shift reactor within a steam generator that contains water boiling at a temperature range of about 360° F. to 400° F., corresponding to a boiler pressure of about 153 psia to 247 psia.

Because the vessel walls of the lower temperature shift reactor are in heat transfer communication with boiling water, the heat released from the water-gas shift reaction is effectively removed to control the temperature in the catalyst bed within the desired operating temperature range. Furthermore, the heat released from the water-gas shift reaction is beneficially recovered to generate steam that is used in the process. Finally, the steam generator provides a convenient source of heat for heating the catalyst bed during start-up.

U.S. Pat. No. 6,086,840 describes a process for making ammonia that mentions use of an isothermal shift reactor that includes heat exchange tubes extending within a vessel packed with catalyst. The heat exchange tubes contain a boiling fluid to remove heat from the catalyst bed.

SUMMARY OF THE INVENTION

It is the general object of this invention to provide a novel catalytic reaction apparatus and process for the reduction of carbon monoxide contained in hydrogen-rich gas streams, employing lower temperature shift reactor that is in thermal communication with a steam generator operating in a temperature range that is optimum for catalytic activity and thermodynamic conversion, and allows the recovery of useful waste heat to generate steam needed for a process to convert hydrocarbons feedstocks to useful gases, such as hydrogen. The subject invention is particularly well suited for the production of hydrogen for fuel cells having low tolerance to carbon monoxide.

Basically, the invention provides a thermally-integrated low temperature water-gas shift reactor for converting carbon monoxide in the presence of steam to form carbon dioxide and water comprising, in combination, a) a waste-heat recovery steam generator for the beneficial recovery of exothermic reaction heat to generate steam that is used in a process for the conversion of hydrocarbon feedstock into hydrogen-rich gases, b) an outer annulus extending about said waste-heat steam generator, c) a catalyst bed located within said outer region, and through which reformate gases flow, d) the outer region being in heat transfer communication with the steam generator to maintain the catalyst bed within a predetermined temperature range for operation of a low temperature shift reaction.

These and other objects and advantages of the invention, as well as the details of an illustrative embodiment, will be more fully understood from the following specification and drawings, in which:

DRAWING DESCRIPTION

FIG. 2 is a schematic showing of apparatus for testing a thermally-integrated low temperature water-gas shift apparatus;

FIG. 3b is a section taken on lines 3b–3b of FIG. 3a; and

DETAILED DESCRIPTION

Process and Apparatus

Figure 1:
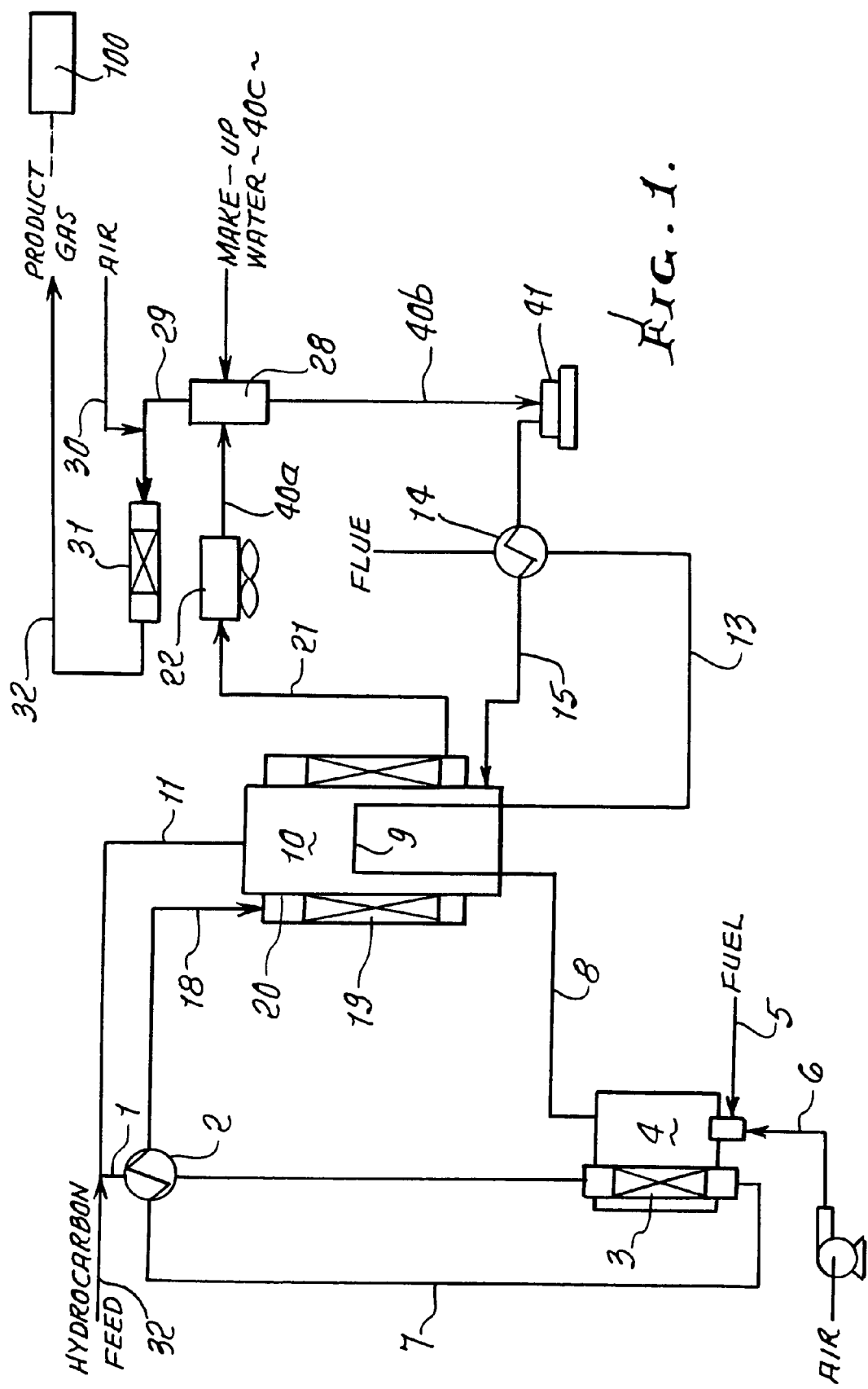
FIG. 1 is a flow diagram of a process that incorporates a thermally-integrated low temperature water-gas shift reactor.

The process and apparatus as shown in FIG. 1 controls the temperature of a low temperature shift reactor and makes beneficial use of the heat of reaction to generate steam that is employed to produce hydrogen-rich gases containing low concentrations of carbon monoxide from hydrocarbon feedstocks.

A reactant mixture at 1 consists of hydrocarbon feedstock 32 and steam 11. The mixture is preheated in an exchanger 2 and introduced into a tubular catalytic reactor 3 that is contained within a combustion chamber 4. The tubular catalytic reactor typically contains a supported Ni catalyst and is commonly referred to in the industry as a steam reformer. Fuel 5 and air 6 are combusted in the chamber 4 to heat the reactant mixture so as to produce a hydrogen-rich stream 7 containing carbon monoxide concentrations typically ranging from 5% to 15%.

Combustion products 8 from the combustion chamber pass through a flue gas heat exchange coil 9 that is contained within a waste heat stem generator 10, wherein the combustion products are cooled and steam 11 is generated. The cooled combustion products 13 are further cooled by exchanging heat in a feed water exchanger 14 that produces heated water 15 that is supplied to the waste heat steam generator 10.

The hydrogen-rich stream 7 from the tubular catalytic reactor 3 is cooled in an exchanger 2 to a temperature typically in the range of 400° F.–550° F. whereupon the cooled stream 18 is introduced into a fixed-bed catalytic reactor 19 shown as surrounding steam generator 10, to effect a water gas shift reaction that converts a portion of the carbon monoxide to hydrogen and carbon dioxide by reaction with steam. The catalyst bed reactor typically contains a supported Cu/Zn catalyst and is commonly known in the industry as a low temperature shift reactor. The walls 20 of the low temperature shift reactor are in thermal communication with boiling water contained in the waste heat steam generator. The heat released in the low temperature shift reactor is thus beneficially recovered to generate steam. The carbon monoxide concentration of the process gas 21 exiting the low temperature shift reactor is typically less than 0.5%.

The products from the low temperature shift reactor are cooled in a process exchange coil 22 to condense moisture. The condensed moisture 40a is separated in a separator vessel 28 and is pumped at 40b to heat exchanger 14 using pump 41. Make-up water may be added as at 40c. The cooled process gas 29 is mixed with a small quantity of air 30 and is sent to the selective oxidizer reactor 31. The required quantity of ambient air that must be introduced into the process gas depends on the specific performance of the catalyst but typically ranges from 2 to 4 times the quantity necessary to provide a stoichiometric quantity oxygen for the complete oxidation of carbon monoxide.

The process gas 32 exiting the selective oxidizer typically contains less than 10 ppm carbon monoxide and is available for use, for instance, in fuel cells having a low tolerance to carbon monoxide. A fuel cell is indicated at 100.

Experimental Data

Tests were conducted to measure the conversion of carbon monoxide contained in a simulated reformate gas stream that was passed over a commercial Cu/Zn catalyst. The Cu/Zn catalyst was contained within tubular conduit walls that were in thermal communication with a boiling water fluid. The objective of the tests was to quantify the relation between CO conversion and catalyst gas hourly space velocity (GHSV) as a function of the temperature of the boiling water fluid.

The experimental test system is shown in FIG. 2. The Cu/Zn catalyst 80 was packed in a ¾ inch tube 81 that was surrounded by a metallic water jacket 82. Steam 83 generated from the water jacket was sent to a condenser 84 and the condensed liquid 85 was returned to the water jacket by natural circulation. An electrical heater 86 was placed on the outer surface of the jacket and a temperature controller 87 was used to control the heat input in order to maintain the water jacket at the desired temperature. A simulated reformate gas mixture 88 was heated in a pre-heater 89 to a temperature approximately equal to the boiling water fluid temperature before the gases entered the catalyst bed. The product gases 90 at the exit of the catalyst bed were cooled, condensed and sent to a gas chromatograph for compositional analysis. Table 2 summarizes the results for tests conducted using the experimental apparatus.

TABLE 2

Carbon Monoxide exit concentration as a function of boiler temperature and catalyst space velocity
Simulated Reformate Composition at Inlet to Reactor:

| Component | Wet Gas Vol. % | Dry Gas Vol. % |
|---|---|---|
| CO | 5.70 | 10.0 |
| $CO_2$ | 8.55 | 15.0 |
| $H_2$ | 39.90 | 70.0 |
| $CH_4$ | 2.85 | 5.0 |
| $H_2O$ | 43.00 | 0.0 |
| Total | 100.00 | 100.0 |

| Dry Gas GHSV (hr$^{-1}$) | Boiler Temperature ° F. | Carbon Monoxide Exit Concentration (Vol. % dry gas) |
| --- | --- | --- |
| 1930 | 340 | 3.67 |
| 762 | 340 | 0.62 |
| 2950 | 385 | 2.84 |
| 2440 | 385 | 2.08 |
| 1930 | 385 | 1.70 |
| 1425 | 385 | 0.90 |
| 1930 | 398 | 1.08 |
| 1425 | 398 | 0.55 |

In order to maximize hydrogen yield and minimize the quantity of carbon monoxide that must be converted in the selective oxidizer, it is generally desirable to achieve less than 1.0 vol. % CO in the dry gas at the exit of the shift reactor. It is desirable to operate at the maximum space velocity in order to minimize the size of the catalyst bed.

The results show that when the boiler is maintained at temperatures above about 385° F., the CO concentration is less than about 1.0 vol. % (dry gas) for space velocities less than or equal to about 1500 hr-1. Higher space velocities can be achieved for even higher boiler temperatures, however this necessitates operation at pressures above 250 psig, which may not be desirable for many PEM fuel cell applications.

The results indicate that there is an optimum temperature range of operation for the boiler that achieves the objects of minimum catalyst volume, moderate boiler pressure and low CO concentration at the shift reactor exit. This optimum temperature range is approximately 385° F. to 400° F.

Thermally-Integrated Low Temperature Water-Gas Shift Reactor Apparatus

Figure 3A:
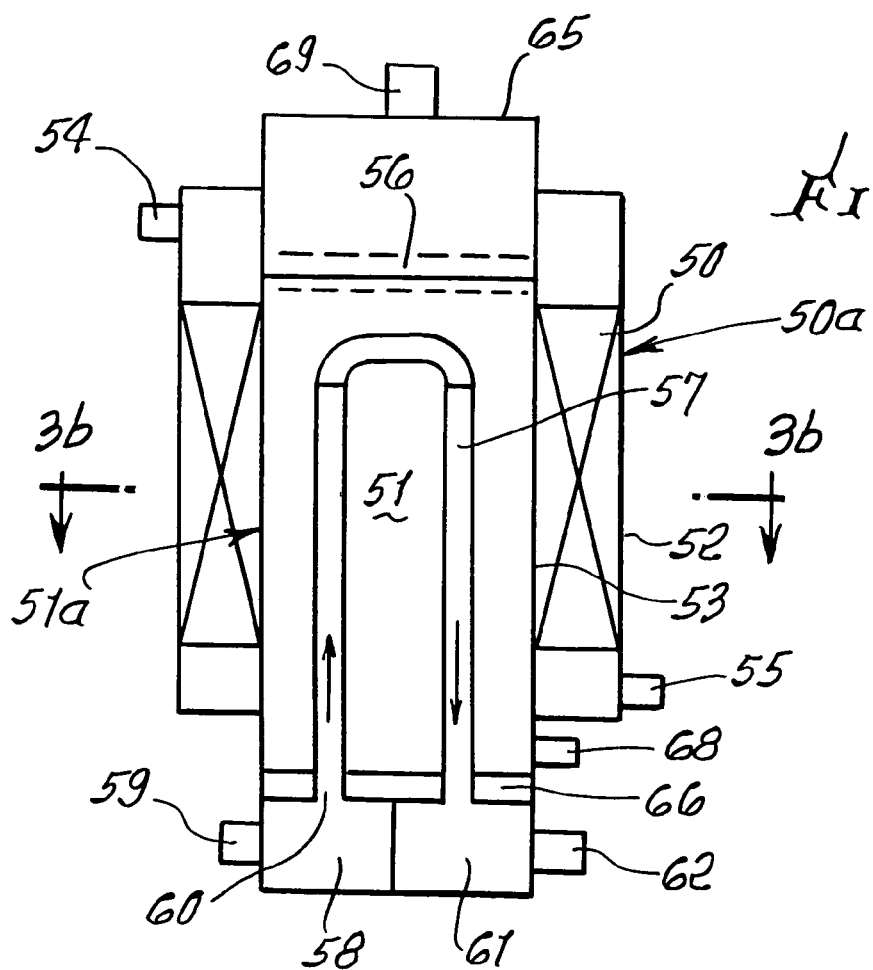
FIG. 3a is a schematic showing of a thermally-integrated low temperature water-gas shift reactor apparatus.
Figure 3B:
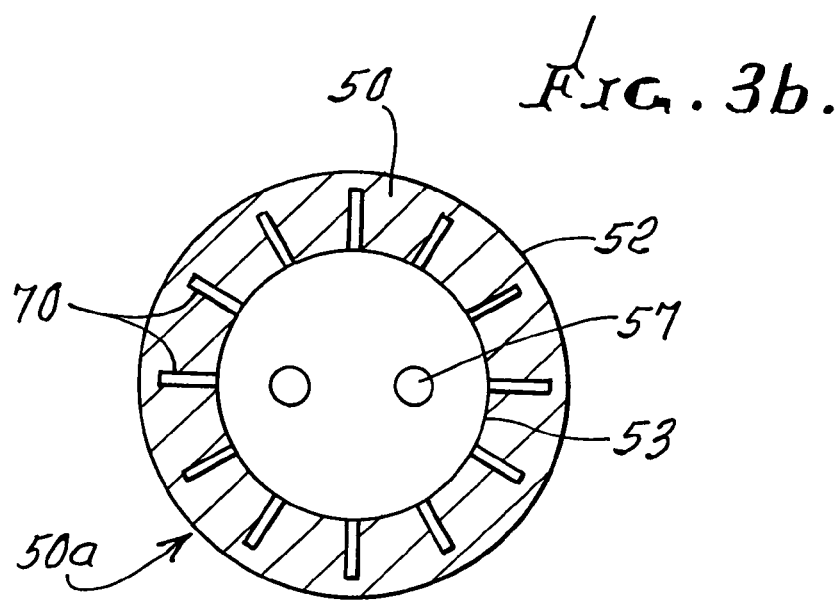

Apparatus shown in FIGS. 3a and 3b controls the temperature of a low temperature shift reactor and makes beneficial use of the heat of reaction to generate steam.

In the preferred embodiment, the apparatus comprises an annular catalyst zone 50 within vessel 50a that is concentrically disposed around an inner steam generator zone 51 within vessel 51a. The catalyst zone contains a lower temperature shift catalyst, typically comprising a catalytically active mixture of copper and zinc metals, that promote the water-gas shift reaction at temperatures typically in the range of 370° F. to 500° F. The catalyst zone is defined by the annular space between an outer wall 52 and an inner wall 53. The steam generator zone is defined in the space inside of the inner wall, a top wall 65, and a tube sheet 66.

Reformate containing carbon monoxide enters an inlet conduit 54 that is in communication with the annular catalyst zone. The reformate passes through the catalyst zone, releasing heat due to the exothermic nature of the water-gas shift reaction. The reformate exits from the catalyst zone through an exit conduit 55.

The inner wall 53 is in thermal contact with the reformate gases flowing through the catalyst zone and boiling water 56 contained in the steam generator zone, the catalyst zone shown as surrounding the steam generation zone. This results in a transfer of heat from the catalyst zone to the steam generator zone in order to maintain the catalyst zone within a defined temperature range that is optimum for conducting the low temperature shift reaction.

The steam generator zone contains a heat transfer conduit 57, or a multitude of heat transfer conduits, that is immersed within the boiling water. The heat transfer conduit conveys hot combustion products, such as from the combustion section of a steam reformer, to transfer heat to the boiling water for the purpose of generating steam. The hot combustion products enter an inlet plenum 58 through an inlet conduit 59. The inlet plenum is in communication with the inlet portion 60 of the heat transfer conduit. The hot combustion products exit the heat transfer conduit to an exit plenum 61 that is connected to an exit conduit 62. Steam that is generated from the heat transferred to the steam generator zone through the inner wall 53 and the heat transfer conduit 57 exits the steam generator zone through an exit conduit 68. Water is fed to the steam generator zone through an inlet conduit 69 to maintain the boiling water at a desired level that is sufficient to efficiently remove heat from the inner wall and the heat transfer conduit.

The annular catalyst zone 50 may include means to enhance heat transfer between the catalyst bed and the inner wall 53 such as the use of longitudinal fins 70 that are attached to the inner wall and extend a distance into the annular catalyst space. Other heat transfer enhancements such as metal packing within the annular catalyst zone, or active catalyst that are incorporated into highly thermally conductive monoliths, may be beneficially used in the invention.

EXAMPLE

A pipe wall having an outside diameter of 5.5 inches defines a waste heat steam generator zone. The pipe wall is in thermal communication with an annular catalyst zone that is concentrically disposed around the waste heat steam generator zone. The space between the 5.5 inch diameter pipe and an outer wall having an 8 inch inside diameter define the annular catalyst zone. The annular catalyst zone is packed with 4.8 mm×2.8 mm low temperature shift catalyst containing principally a mixture of Cu and Zn supported on a ceramic carrier. The packed height of the annular catalyst zone is approximately 12 inches and corresponds to the approximate height of the water contained within the waste heat steam generator zone. The total catalyst volume is approximately 0.184 cubic feet.

The waste heat steam generator zone also contains heat transfer conduits that are immersed within the boiling water. The heat transfer conduits consist of ⅝ inch diameter tubes that are formed in a u-tube arrangement having inlet means and exit means that are attached to a single tube sheet. Hot combustion products from a steam reformer are directed to the inlet means of the heat transfer tubes. Cooled combustion products are exhausted from the exit means of the heat transfer tubes.

The waste heat steam generator zone is operated at a controlled pressure using a back-pressure regulator that is located on the steam exit conduit. The back-pressure regulator is set at a pressure of 220 psia corresponding to a saturated water temperature of 390° F.

Reformate from a tubular catalytic reactor is cooled to approximately 510° F. and is introduced into the top of the annular catalyst zone. The reformate exits the bottom of the annular catalyst zone at a temperature of approximately 430° F. The composition and flow rate of the reformate at the inlet and exit of the annular catalyst zone is shown in Table 3.

TABLE 3

Gas composition from thermally-integrated low
temperature water-gas shift reactor

| | Gas Composition (Volume %) | |
|---|---|---|
| Component | Reformate Inlet | Reformate Exit |
| CH4 | 2.1 | 2.1 |
| CO | 8.1 | 0.8 |
| CO$_2$ | 7.5 | 14.7 |
| H$_2$ | 52.6 | 59.8 |
| H$_2$O | 29.7 | 22.5 |
| Total | 100.00 | 100.0 |
| Total Flow, SCFH | 280 | 280 |
| Temperature, ° F. | 510 | 430 |
| Pressure, psia | 16.7 | 16.7 |

Figure 4:
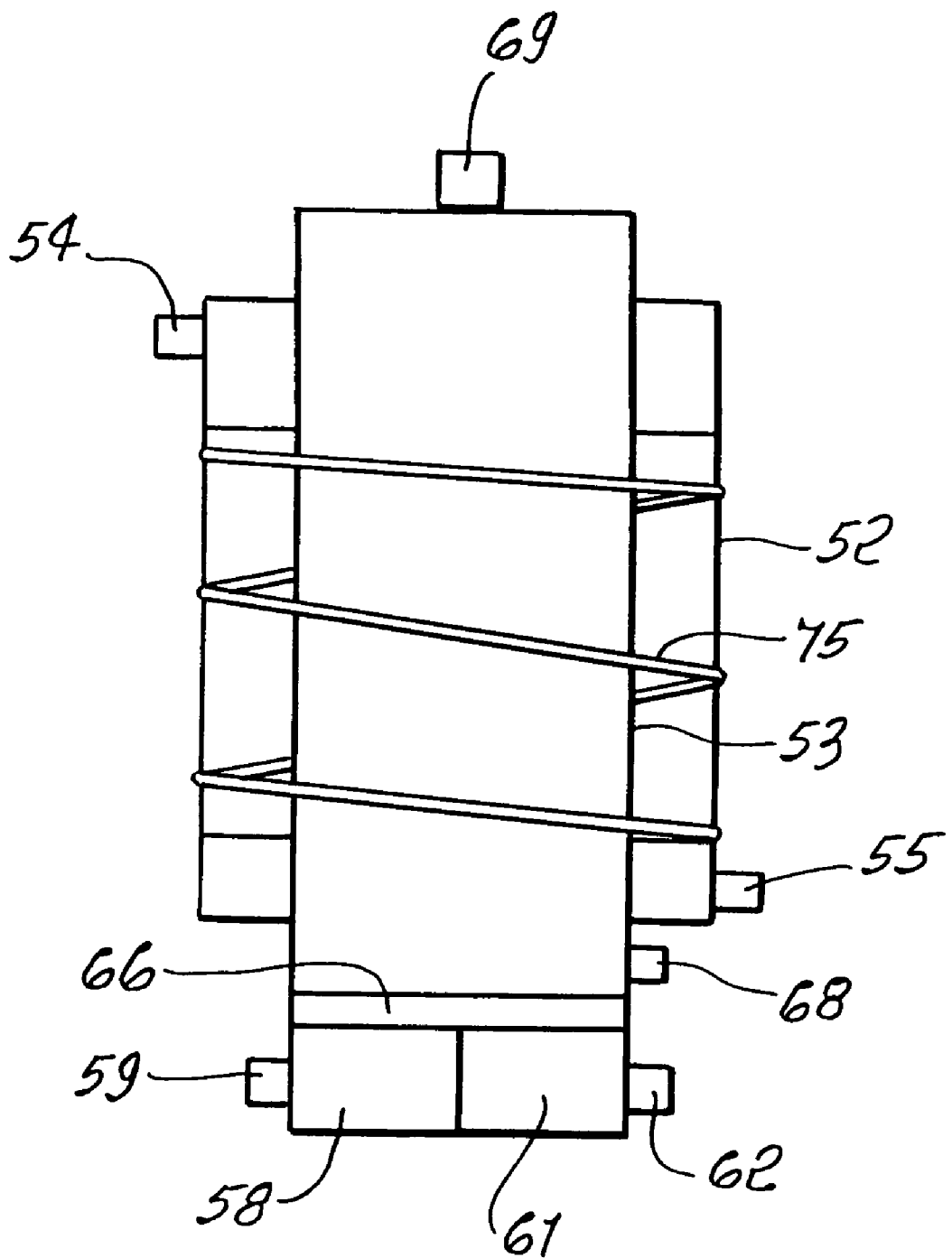
FIG. 4 is a schematic showing of an alternate thermally-integrated low temperature water-gas shift reactor apparatus.

Alternative Embodiment of Thermally-Integrated
Low Temperature Water-Gas Shift Reactor
Apparatus FIG. 4 depicts an alternative embodiment of the thermally-integrated low temperature water-gas shift reactor apparatus. A helical coil 75 is welded to the surfaces of the inner wall 53 and outer wall 52 that define the annular catalyst space. The catalyst is packed within the volumes defined by the helical coil and the inner and outer walls. The gases entering the inlet conduit 54 are directed in a helical manner around the annular space by virtue of the confining helical coil. This increases the velocity of the gases within the catalyst bed for a given space velocity in order to enhance the rate of heat transfer to and from the bed. The helical coil also serves as an extended heat transfer surface to enhance the rate of heat transfer to and from the inner wall of the annular space. Elements the same as those of FIG. 3a bear the same identifying numbers.

We claim:

1. A thermally-integrated water-gas shift reactor for reducing the concentration of carbon monoxide contained in a hydrogen-rich reformate gas, according to the water-gas shift reaction, said reactor comprising:
   an inner generally cylindrical vessel containing a volume of boiling water, said inner generally cylindrical vessel defining a waste-heat recovery steam generator for recovering reaction heat generated by the water-gas shift reaction to produce steam from the boiling water;
   an outer generally cylindrical vessel disposed concentrically about the inner generally cylindrical vessel to define an annular space therebetween, said outer generally cylindrical vessel having an outer surface that is exposed to the atmosphere;
   a helical coil inserted within the annular space, said helical coil being welded to both the outer surface of the inner generally cylindrical vessel and the inner surface of the outer generally cylindrical vessel;
   a reaction zone defined by the space confined between the helical coil, the outer surface of the inner generally cylindrical vessel, and the inner surface of the outer generally cylindrical vessel, said reaction zone being filled with a water-gas shift catalyst for catalyzing the water-gas shift reaction;
   an inlet for supplying reformate gas to the reaction zone; and
   an outlet for discharging reformate gas, with a reduced concentration of carbon monoxide, from the reaction zone;
   wherein the reformate gas that is supplied to the reaction zone is directed through the catalyst in a helical manner, around the waste-heat recovery steam generator; and
   wherein the helical coil functions as an extended heat transfer surface to enhance the rate of heat transfer between the reaction zone and the waste-heat recovery steam generator.

2. The reactor according to claim 1, wherein the waste-heat recovery steam generator is configured to operate under a temperature within the range of 360° F. to 450° F., said temperature being optimum for conducting the water-gas shift reaction.

3. The reactor according to claim 1, wherein the waste-heat recovery steam generator is configured to operate under a temperature within the range of 385° F. to 400° F., said temperature being optimum for conducting the water-gas shift reaction.

4. The reactor according to claim 1, wherein the catalyst comprises a catalytically active mixture of copper and zinc metals.

5. The reactor according to claim 4, wherein the boiling water functions to heat the catalyst during start-up, and wherein the catalyst supplies reaction heat to the boiling water for generating steam during operation.

6. The reactor according to claim 1, wherein the width of the annular space is between 1 and 2 inches, to minimize the temperature differential between the wall of the inner generally cylindrical vessel and the wall of the outer generally cylindrical vessel, and wherein the helical coil is configured to increase the flow velocity of the reformate gas through the reaction zone for a given space velocity, said space velocity being in the range of 500 hr$^{-1}$ to 2,000 hr$^{-1}$.

7. The reactor according to claim 1, wherein the catalyst is maintained at a temperature within the range of 370° F. to 550° F.

8. The reactor according to claim 1, wherein the catalyst is maintained at a temperature within the range of 400° F. and 450° F.

9. The reactor according to claim 4, wherein the width of the annular space is between 1 and 2 inches, to minimize the temperature differential between the wall of the inner generally cylindrical vessel and the wall of the outer generally cylindrical vessel.

10. The reactor according to claim 4, wherein the helical coil is configured to increase the flow velocity of the reformate gas through the reaction zone for a given space velocity, said space velocity being in the range of 500 hr$^{-1}$ to 2,000 hr$^{-1}$.

11. The reactor according to claim 1, wherein at least one heat transfer conduit is immersed in the volume of boiling water within the waste-heat recovery steam generator, said at least one heat transfer conduit being in fluid communication with a source of combustion products for heating the boiling water.

12. The reactor according to claim 1, wherein the inlet for reformate gas is located in an upper part of the reaction zone, and the outlet for reformate gas, with the reduced concentration of carbon monoxide, is located in a lower part of the reaction zone; and
   at least one heat transfer conduit is immersed in the volume of boiling water within the waste-heat recovery steam generator, said at least one heat transfer conduit being in fluid communication with a source of combustion products for heating the boiling water.

* * * * *